March 1, 1966     M. HAYMAN ETAL     3,237,498
DISPENSER AND CUTTER FOR FLORAL WIRE AND
ARTIFICIAL FLOWER STEMS
Filed Sept. 25, 1964     2 Sheets-Sheet 1
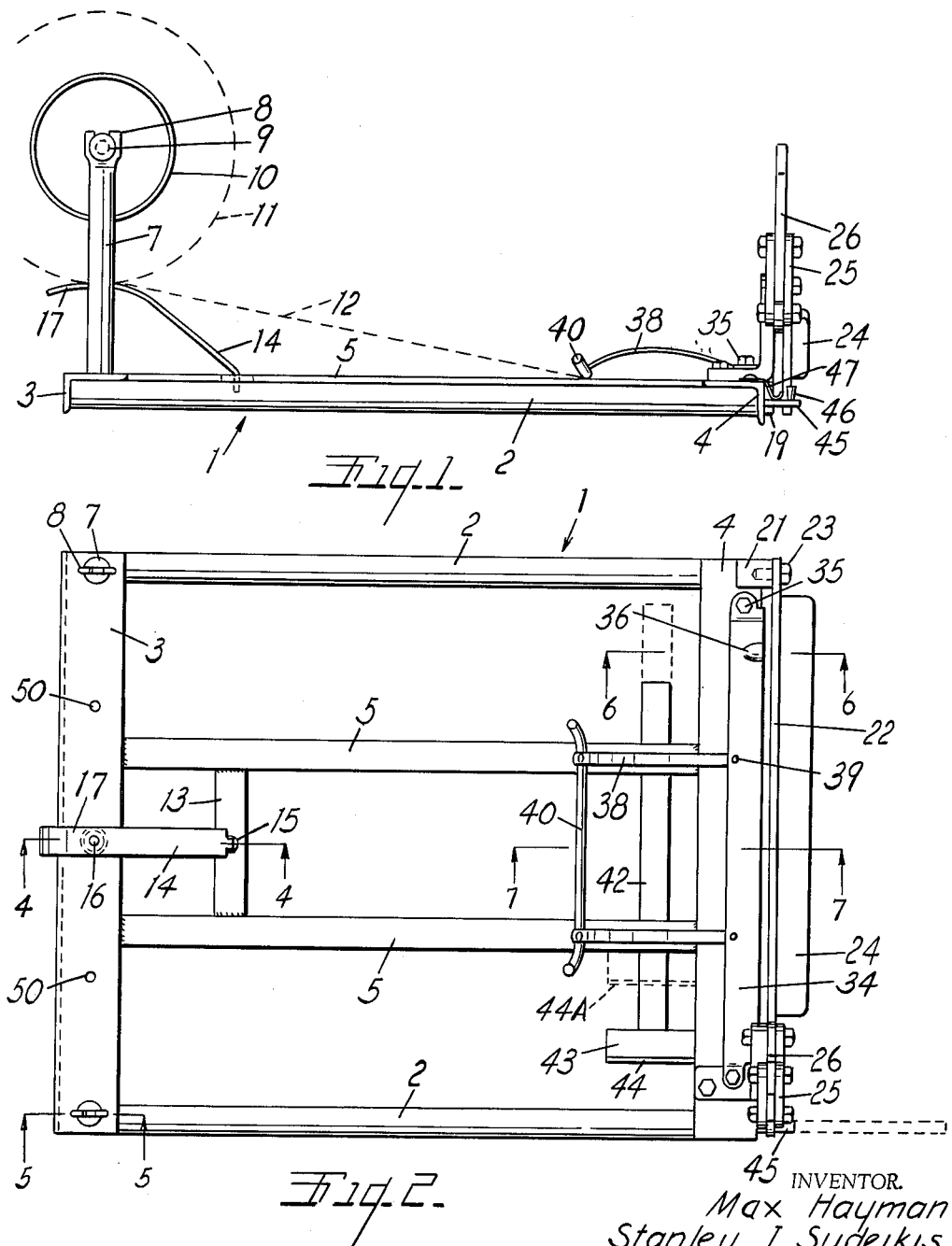
INVENTOR.
Max Hayman
Stanley I. Sudeikis
BY
ATTORNEY

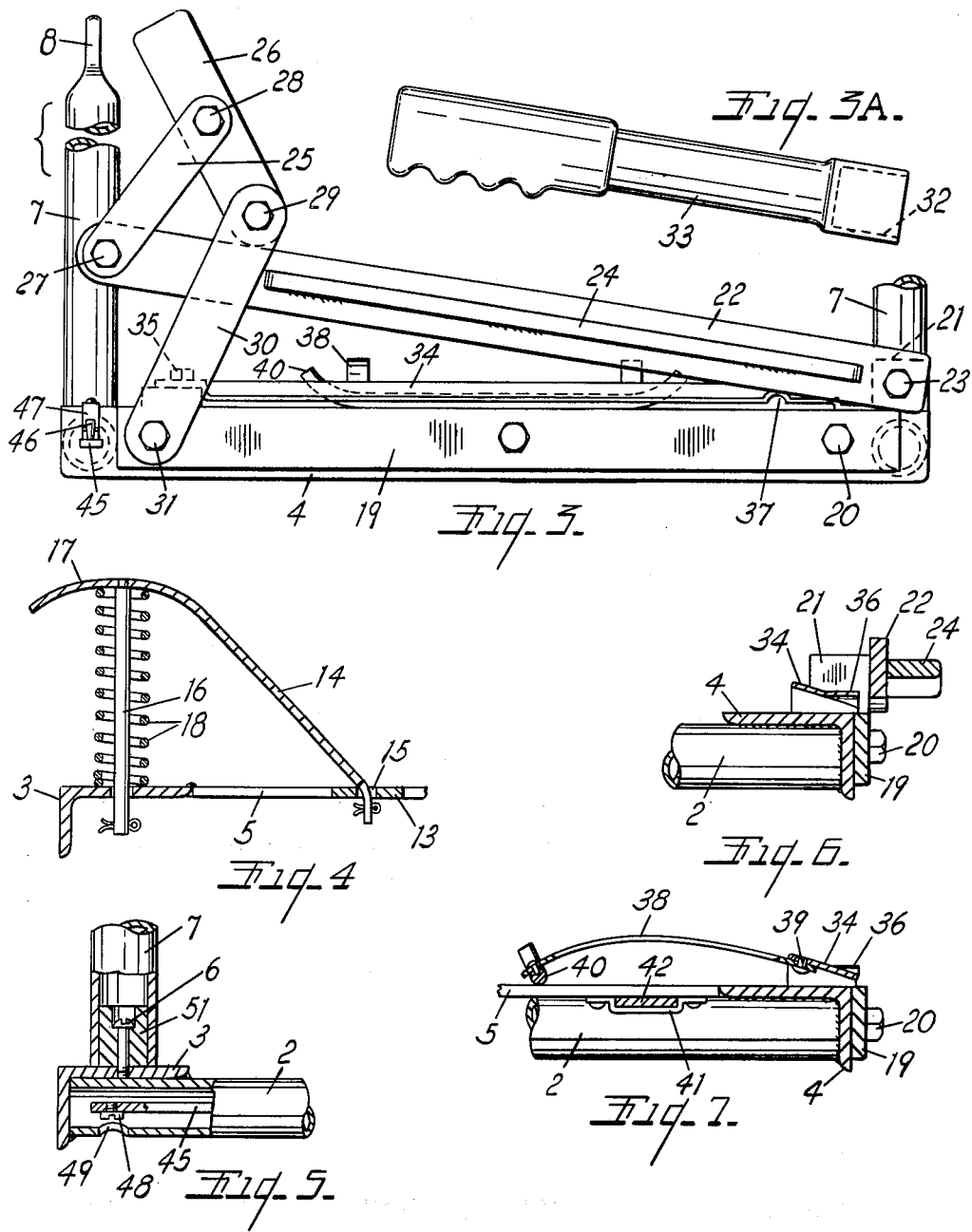

United States Patent Office 3,237,498
Patented Mar. 1, 1966

3,237,498
DISPENSER AND CUTTER FOR FLORAL WIRE AND ARTIFICIAL FLOWER STEMS
Max Hayman, Battle Creek, and Stanley I. Sudeikis, Kalamazoo, Mich., assignors, by mesne assignments, to Mid-States Steel & Wire Company, Crawfordsville, Ind., a corporation of Indiana
Filed Sept. 25, 1964, Ser. No. 399,164
4 Claims. (Cl. 83—450)

This invention relates to improvements in dispenser and cutter for floral wire and artificial flower stems. The principal objects of this invention are:

First, to provide an effective cutter for severing measured lengths of wire mesh used as a base for floral displays which can be adjusted to accommodate wire mesh of different widths and which will also cut the wire stems of artificial flowers quickly and cleanly.

Second, to provide a support for a roll of wire mesh for floral supports which will permit rapid cutting of lengths of the mesh from the roll without threading the mesh to the cutter with each operation.

Third, to provide a wire mesh cutter of the type described which is rugged and effective in operation but which can be easily disassembled for shipment and storage in a small compact package.

Other objects and advantages of the invention will be apparent from a consideration of the following description and claims. The drawings, of which there are two sheets, illustrate a highly practical form of the wire cutter in assembled operative relation.

FIG. 1 is a side elevational view of the cutter with the operating handle removed.

FIG. 2 is a top plan view of the base of the cutter with the wire mesh supporting drum and the operating handle removed.

FIG. 3 is a fragmentary front elevational view of the cutter partially broken away is section and with the operating handle removed.

FIG. 3A is an elevational view of the handle attachable to the cutter shown in FIGS. 1, 2 and 3.

FIG. 4 is a fragmentary vertical cross sectional view taken along the plane of the line 4—4 in FIG. 2 showing one of the drag brakes operative on the wire mesh which is to be supported in the cutter.

FIG. 5 is a fragmentary vertical cross section view taken along the plane of the line 5—5 in FIG. 2 illustrating the structure for removably mounting the roll supporting posts on the cutter and for attaching the stop to the wire measuring scale incorporated in the cutter.

FIG. 6 is a fragmentary vertical cross sectional view taken along the plane of the line 6—6 in FIG. 2 illustrating the relation of the mesh guide and flower stem guide to the cutting blades of the cutter.

FIG. 7 is a fragmentary vertical cross sectional view taken along the plane of the line 7—7 in FIG. 2 illustrating a second drag or brake structure for preventing wire mesh from pulling backwardly away from the cutter blades after a section has been cut from the wire mesh.

In the florist trade, it is common to make up floral displays such as wreaths and sprays by mounting cut flowers on open mesh wire which is supplied in rolls for such purpose. The rolls of wire mesh are commonly supplied in two different widths so the cutter of the invention is adapted to accommodate both wide and narrow widths of wire mesh as will be described. It is also common in the florists trade to utilize artifical flowers and leaves having elongated stems of coated wire and these stems must be cut to length to fit into the particular display being assembled by the florist. The cutter of the invention is adapted to quickly cut such artificial stems so that the florist preparing a display can cut both the mesh backing and the artificial flower stems on the same machine.

The cutter of the invention comprises a rigid base designated generally by the numeral 1 and consisting of tubular side members 2 connected at the back by a cross member 3 of angled cross section and connected at the front by a second cross member 4 of similar angled cross section. Intermediate of the side frame members 2 there are provided two laterally spaced longitudinally extending support bars 5 which support the wire mesh being delivered to the cutter.

At the rear end of the base the rear cross member 3 is provided with upstanding studs 51 as appears more clearly in FIG. 5. The studs are held in place by screws 6 and serve to telescopically and removably support upright posts 7 having flattened upper ends with yoke bearings 8 formed therein. The yoke bearings removably receive the projecting axle pins 9 of a light metal drum 10 which is sized to fit within the coils of wire mesh as they are furnished commercially. A coil of the wire mesh is indicated by the dotted lines at 11 in FIG. 1 and the web of the mesh is directed forwardly over the base as at 12 in FIG. 1.

In order to prevent the wire mesh from rerolling onto the roll 11 the base is provided with a short cross bar 13 extending between the support bars 5. An angled drag brake lever 14 having its lower front end turned downwardly is passed through a hole 15 in the cross bar 13 and projects rearwardly and upwardly underneath the drum 10. A guide pin 16 secured to the underside of a convex upper end portion 17 projects downwardly through a hole in the rear cross member 3 as appears in FIG. 4 and is surrounded by a coil spring 18 that constantly urges the drag brake upwardly into engagement with the roll 11 of wire mesh.

The cutting mechanism mounted on the front cross member 4 consists of a hardened and sharpened steel fixed cutting blade 19 secured to the front flange of the cross member by cap bolts 20. The upper edge of the blade 19 is desirably flush with the upper surface of the cross member 4.

Secured to the far or right end of the front cross member 4 as viewed in FIGS. 3 and 6 is a block 21 to which one end of a swingable cutting knife 22 is pivoted by the pivot screw or bolt 23. The knife is swingable in cutting relation with the edge of the fixed blade 19 and is desirably laterally reinforced by the flange plate 24 welded to the front of the blade. The near or left end of the blade 22 as viewed in FIG. 3 is connected by a pivot link 25 to an operating lever 26. Pivot bolts or screws 27 and 28 connect the lever to the knife. The lower inner end of the lever 26 is connected by a pivot bolt 29 to a link 30 which is in turn fixedly pivoted to the front cross member and fixed knife 19 by a pivot screw or bolt 31. The linkage and levers 25 to 31 constitute a force multiplying assembly for providing strong cutting movement of the knife 22 downwardly across the edge of the fixed blade 19. The end of the operating lever 26 is sized to fit removably within the socket 32 formed in the end of a removable handle 33 shown in FIG. 3A. By making the handle 33 removable the size of the shipping container required for the cutter is materially reduced.

Secured to the front cross member 4 immediately behind the knife 22 is a mesh and stem guide strip 34 held in place by cap screws 35. The rear edge of the guide strip 34 is raised as appears most clearly in FIGS. 6 and 7 while its forward edge is converged downwardly into closely spaced relation over the top surface of the fixed blade 19. This guides the wire mesh from the roll 11 and the drag brake lever 14 to the cooperating cutting edges of the blade 19 and knife 22. Adjacent its far or right end and closely adjacent the pivot 23 of the knife, the guide plate 34 is provided with an upwardly offset downwardly concave rib 36 which defines a radially enlarged opening 37 for receiving the wire stems of artificial flowers and ferns closely adjacent to the pivot 23. This permits the cutter to easily cut the stems of artificial flowers.

In order to further prevent retraction of the wire mesh from the cutting blade after completion of a cut the guide strip 34 is provided with two rearwardly projecting and downwardly bowed leaf springs 38 secured to the guide strip by rivets 39. The rear ends of the spring 38 support a drag shoe in the form of a transversely extending bar 40 in yieldable downwardly pressed relation to the longitudinal support bars 5. The wire mesh placed on the cutter is passed underneath this drag shoe 40 and is held against pulling back away from the knives by the pressure of the drag shoe.

Secured to the undersides of the support bars 5 just rearwardly from the front cross member 4 are a pair of U-shaped slide support clips 41 which adjustably support the transversely extending support bar 42 of a side guide member 43. The side guide member 43 is an angle shaped piece having an upstanding flange 44 adapted to guide the front or near edge of the wire mesh into the space underneath the top guide strip 34. As appears in FIG. 2 the side guide 43-44 may be moved outwardly for wide mesh wire as shown in full lines or may be slid inwardly to the dotted position shown at 44A to guide narrower wire mesh to the cutting blade and knife.

In order to facilitate cutting the desired length of wire mesh from the roll, the near or lower side member 2 houses a measuring bar 45 having scale indicia thereon. The bar 45 projects through a hole provided therefor in the downturned flange of the front cross member 4 and is provided with a knob or handle 46 for pulling the measuring bar out in front of the cutter. A spring clip 47 (see FIG. 1) holds the measuring bar in adjusted position. In order to prevent withdrawal of the measuring bar completely from the side member 2 the inner end of the measuring bar is provided with a stop screw 48' (see FIG. 5) which can be installed through a hole 49 formed in the bottom of the side member 2.

From the foregoing it can be seen that the drum 10 can be removed from the upright posts 7 and the posts can be removed from the supporting studs 5. The handle 33 can be removed from the operating lever 26 and the entire structure can be compactly packed in a small box for shipment. Assembly of the parts of the cutter is simple and requires no tools. The cutter may be assembled and operated from a free position on any support adjacent the florists working area or it may be more or less permanently secured in place by screws passed through the holes 50 in the rear cross member 3.

What is claimed as new is:

1. A cutter for floral wire and artificial flower stems comprising,
a flat rectangular base having tubular side members with a cross bar extending between the front ends of said members,
a fixed cutting blade secured along the front of said cross bar, a knife pivotally mounted on said frame to coact with said fixed cutting blade,
a top guide positioned in spaced relation over said cross bar and converging downwardly toward said blade,
a handle and force multiplying linkage connected between the other end of said cross bar and the swinging end of said knife,
said top guide having a raised portion defining a stem receiving guide adjacent the pivoted end of said knife,
a pair of posts removably supported on studs secured to the rear ends of said side members and having bearing yokes on their upper ends,
a drum adapted to support a roll of floral wire and having axles on its ends receivable in said yokes,
a second cross bar in said base located forwardly of said posts,
a drag brake lever having its lower end pivoted in said second cross bar and an upwardly convex upper end,
a spring compressed between said base and said brake lever biasing the lever toward said drum,
a drag shoe located behind said first cross member,
yieldable bow springs connected to said top guide and supporting said drag shoe,
longitudinal support bars on said base opposed to said drag shoe and supporting said second cross bar,
a side guide having a transversely extending arm slidably supported on said longitudinal support bars and adjustable toward and away from one of said side members,
and a measuring rod projecting slidably from the front end of one of said side members,
and a measuring rod projecting slidably from the front end of one of said side members,
said one side member having a hole formed in its underside, and
a stop accessible through said hole threaded into the inner end of said measuring bar.

2. A cutter for floral wire and artificial flower stems comprising,
a flat rectangular base having tubular side members with a cross bar extending between the front ends of said members,
a fixed cutting blade secured along the front of said cross bar, a knife pivotally mounted on said frame to coact with said fixed cutting blade,
a top guide positioned in spaced relation over said cross bar and converging downwardly toward said blade,
a handle and force multiplying linkage connected between the other end of said cross bar and the swinging end of said knife,
a pair of posts removably supported on studs secured to the rear ends of said side members and having bearing yokes on their upper ends,
a drum adapted to support a roll of floral wire and having axles on its ends receivable in said yokes,
a second cross bar in said base located forwardly of said posts,
a drag brake lever having its lower end pivoted in said second cross bar and an upwardly convex upper end,
a spring compressed between said base and said brake lever biasing the lever toward said drum,
a drag shoe located behind said first cross member,
spring means connected to said top guide and supporting said drag shoe,
longitudinal support bars on said base opposed to said drag shoe,
a side guide having a transversely extending arm slidably supported on said longitudinal support bars and adjustable toward and away from one of said side members, and
a measuring rod projecting slidably from the front end of one of said side members.

3. A cutter for floral wire and artificial flower stems comprising,
a flat rectangular base having side members with a cross bar extending between the front ends of said members,
a fixed cutting blade secured along the front of said cross bar,
a top guide positioned in spaced relation over said cross bar and converging downwardly toward said blade, a knife movably mounted on said frame to coact with said fixed cutting blade,
a handle and force multiplying linkage connected between the other end of said cross bar and the swinging end of said knife, said top guide having a raised portion defining a stem receiving guide adjacent the pivoted end of said knife, a pair of posts removably supported on the rear ends of said side members and having bearing yokes on their upper ends, a drum adapted to support a roll of floral wire and having axles on its ends receivable in said yokes, spaced support bars extending longitudinally between said side members, and a drag shoe yieldably supported from said base and spring pressed to frictionally engage a length of wire mesh between said drum and said top guide.

4. A cutter for floral wire and artificial flower stems comprising:

a flat rectangular base, a fixed cutting blade secured along one end of base, a top guide positoned in spaced relation over the base at said one end thereof and converging downwardly toward said blade, a knife pivoted at one end to said one end of the base at one side thereof and swingable over the cutting blade, a handle pivotally connected to the base at the other side of said one end thereof, a force multiplying linkage connecting the handle to the other end of the knife, said top guide having a raised portion defining a stem receiving guide adjacent the pivoted end of the knife, means on the base adjacent to the other end thereof to support a roll of wire, and a drag shoe yieldably supported from the base and spring pressed to frictionally engage a length of wire mesh on the base between a roll of wire on the supporting means and the top guide.

References Cited by the Examiner

UNITED STATES PATENTS

| | | | |
|---|---|---|---|
| 244,253 | 7/1881 | Judd | 83—522 X |
| 390,515 | 10/1888 | Owen | 83—522 X |
| 710,310 | 9/1902 | Wesselman | 83—604 |
| 1,846,811 | 2/1932 | Link | 83—649 X |
| 2,257,446 | 9/1941 | Amidon | 83—447 X |
| 2,741,166 | 4/1956 | Weirich et al. | 83—604 X |
| 2,753,938 | 7/1956 | Thiess | 83—649 X |
| 2,871,939 | 2/1959 | Close | 83—649 X |
| 2,977,834 | 4/1961 | Tyjewski | 83—604 X |

WILLIAM W. DYER, JR., *Primary Examiner.*

J. M. MEISTER, *Assistant Examiner.*